(12) United States Patent
Kanda

(10) Patent No.: US 7,523,945 B2
(45) Date of Patent: Apr. 28, 2009

(54) SEALING APPARATUS

(75) Inventor: Tsuyoshi Kanda, Fukushima (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/572,675

(22) PCT Filed: Sep. 15, 2004

(86) PCT No.: PCT/JP2004/013429

§ 371 (c)(1),
(2), (4) Date: Mar. 20, 2006

(87) PCT Pub. No.: WO2005/028929

PCT Pub. Date: Mar. 31, 2005

(65) Prior Publication Data

US 2007/0132194 A1    Jun. 14, 2007

(30) Foreign Application Priority Data

Sep. 19, 2003  (JP) ............................. 2003-327923

(51) Int. Cl.
*F16J 15/32* (2006.01)
(52) U.S. Cl. .................. 277/549; 277/552; 277/559
(58) Field of Classification Search .............. 277/549, 277/552, 559
See application file for complete search history.

(56) References Cited

U.S. PATENT DOCUMENTS

| 3,923,315 A * | 12/1975 | Hadaway ............... 277/559 |
| 4,288,083 A | 9/1981 | Braconier |
| 5,104,603 A | 4/1992 | Saitoh |
| 5,511,886 A * | 4/1996 | Sink ...................... 384/486 |
| 5,577,741 A * | 11/1996 | Sink ...................... 277/559 |
| 6,334,618 B1 * | 1/2002 | Ohta et al. ............... 277/549 |
| 2005/0023767 A1 * | 2/2005 | Ohta et al. ............... 277/549 |

FOREIGN PATENT DOCUMENTS

| JP | 52-148757 | 10/1977 |
| JP | 56-150670 | 11/1981 |
| JP | 02-046371 | 2/1990 |
| JP | 2046371 | 2/1990 |
| JP | 2-109076 | 8/1990 |
| JP | 3-29768 | 3/1991 |
| JP | 07-055014 | 3/1995 |
| JP | 10-252898 | 9/1998 |
| JP | 11-351405 | 12/1999 |
| JP | 2002-228005 | 8/2002 |
| JP | 2003-035371 | 2/2003 |

OTHER PUBLICATIONS

Korean Office Action dated Jul. 10, 2008.
Japanese Official Action dated Feb. 10, 2009.

* cited by examiner

*Primary Examiner*—Patricia L Engle
*Assistant Examiner*—Gilbert Y Lee
(74) *Attorney, Agent, or Firm*—Jacobson Holman PLLC

(57) ABSTRACT

By providing a projection 24 at the root of a seal lip 22, the mechanical loss caused by the seal lip is reduced while restraining the turn-over of the seal lip 22, while maintaining a stable sealing performance by letting the first side surface 24a or the second side surface 24b of this projection 24 exhibit a suction function of returning the fluid that has leaked from the lip tip end of the seal lip 22 to the sealing fluid side O when the shaft and the seal lip 22 are relatively rotated.

4 Claims, 3 Drawing Sheets

SEALING APPARATUS

This is a nationalization of PCT/JP2004/013429 filed 15 Sep. 2004 and published in Japanese.

TECHNICAL FIELD

The present invention relates to a sealing apparatus.

BACKGROUND ART

Conventionally, regarding a sealing apparatus, such as an oil seal for example, that seals an annular gap between a shaft and a housing that are relatively rotated, those being provided with a seal lip that is in sliding contact with the shaft surface are general. Such a sealing apparatus will be described with reference to FIG. 5. FIG. 5 is a partial cross-sectional view of a sealing apparatus according to a related art.

As illustrated, a sealing apparatus 200 according to the related art is provided with a reinforcing ring 210 and a rubber-like elastic body 220 that is baked and fixed to the reinforcing ring 210. The rubber-like elastic body 220 is provided with an outer circumference seal 221 that seals the inner circumferential surface of a shaft hole disposed in a housing not illustrated, a seal lip 222 that seals by being in sliding contact with a shaft surface not illustrated, and a dust lip 223 that seals by being in sliding contact with the shaft surface in the same manner. In the drawings, X indicates a position corresponding to the shaft surface when the sealing apparatus 200 is mounted in an annular gap between the shaft and the housing.

In such a sealing apparatus 200, in order to prevent leakage of the sealing fluid, the seal lip 222 needs to be in contact with the shaft surface at a suitable contact force (force that acts on the shaft surface in a direction perpendicular to the shaft center). The larger this contact force is, the higher the mechanical loss will be.

In order to restrain this mechanical loss, the contact force must be reduced. However, when the contact force of the seal lip 222 is reduced, the sealing performance decreases. For this reason, there is known a technique of providing the sliding contact surface of the seal lip 222 with a thread 222a that exhibits a pump function of returning the leaked sealing fluid to the sealing fluid side (See, for example, the patent document 1). However, in order to let the pump function be exhibited effectively, the distance of the thread 222a in the axial direction must be ensured to some extent. In this case, the contact area of the seal lip will be wide to some extent, so that there is a limit in reducing the contact force of the seal lip.

Also, as a method for reducing the contact force of the seal lip while maintaining the sealing performance, there is a method of reducing the rigidity of the seal lip while sufficiently ensuring the interference of the seal lip. However, in this case, turn-over of the seal lip is liable to be generated. For example, as illustrated in FIG. 5, in a structure in which the seal lip extends toward the sealing fluid side, in the case of an assembly system in which the shaft is inserted from the sealing fluid side toward the anti-sealing fluid side for assembling, the seal lip is more liable to be turned over to the inside according as the rigidity of the seal lip is lower. For this reason, there is a limit in reducing the rigidity of the seal lip and, even in the case of this method, there is a limit in reducing the contact force of the seal lip.

Patent Document 1: Japanese Patent Application Laid-Open No. 52-148757

DISCLOSURE OF THE INVENTION

Problems that the Invention is to Solve

One object of the present invention is to reduce the mechanical loss caused by the seal lip that is in sliding contact with the shaft surface.

Here, in order to reduce the mechanical loss, one may consider reducing the contact force of the seal lip to the shaft surface, as described above; however, in this case, according to the conventional technique, decrease of the sealing performance and the turn-over of the seal lip may be generated.

Therefore, one object of the present invention is to reduce the mechanical loss caused by the seal lip while maintaining a stable sealing performance and while restraining the generation of turn-over of the seal lip.

Also, one object of the present invention is to exhibit a stable sealing performance irrespective of the relative rotation direction of the shaft and the housing.

Means for Solving the Problems

The invention of the present application has adopted the following means in order to solve the aforementioned problems.

Namely, the invention of the present application is constructed to be provided with a projection at the root of the seal lip. This increases the modulus of section, so that, even if the tip end of the seal lip is drawn by the inserted shaft, the turn-over of the seal lip is restrained. Another invention of the present application is constructed to be provided with an annular portion at a position located more to the sealing fluid side than the seal lip. This allows that, even if the tip end of the seal lip is drawn by the inserted shaft, the turn-over of the seal lip is restrained because the annular portion regulates the range of bending of the seal lip.

Also, in the invention of the present application, means that exhibits a function of sucking the sealing fluid towards the sealing fluid side by shaft rotation is provided at a position where sliding resistance is not generated (or is slightly generated) against the shaft surface. Here, a preferred example of the position where sliding resistance is not generated (or is slightly generated) may be an annular portion provided at the root part of the seal lip or at a position located more to the sealing fluid side than the seal lip. By such a construction, the sealing function can be enhanced without increasing the mechanical loss. As a specific example, a projection may be provided at the root of the seal lip or in the aforesaid annular portion, and the side surface of this projection may be allowed to exhibit the function of sucking the sealing fluid. More specifically, the surface of the projection may be opposed to the shaft surface via a slight gap or may be brought into sliding contact with the shaft surface to such a degree that the sliding resistance may not be generated, and a tilted surface that is tilted to the rotation direction side of the shaft according as it goes from the anti-sealing fluid side to the sealing fluid side may be provided on the side surface of the projection. By providing such a tilted surface, the fluid is returned to the sealing fluid side along the tilted surface by shaft rotation.

More specifically, according to the present invention, there is provided a sealing apparatus that seals an annular gap between a shaft and a housing that are relatively rotated, the sealing apparatus being provided with a seal lip that extends toward the sealing fluid side to be in sliding contact with a shaft surface, characterized by being provided with a projection disposed at the root of the seal lip, where the distance between the surface of the projection and the shaft center is set to have a dimension equal to or slightly larger than the radius of the shaft, and at least a part of the side surface of the projection exhibits a suction function of returning the fluid that has leaked from the seal lip tip end to the sealing fluid side when the shaft and the housing are relatively rotated.

According to the construction of the present invention, by providing a projection at the root of the seal lip, the modulus of section of this part increases. Therefore, the turn-over of the seal lip by insertion of the shaft is restrained irrespective of the insertion direction. In addition, since the surface of the projection is set to have a dimension such that the distance from the surface thereof to the shaft center is equal to or slightly larger than the radius of the shaft, a slight gap intervenes between the surface of the projection and the shaft surface or, even if they abut against each other, little contact force is present. Therefore, the sliding resistance against the shaft surface caused by this projection is not generated at all or, even if it is generated, the sliding resistance is little. Also, at least a part of the side surface of the projection exhibits a suction function of returning the fluid that has leaked from the seal lip tip end to the sealing fluid side when the shaft and the housing are relatively rotated, so that the sealing performance can be enhanced. Here, as one of the constructions for allowing this function to be exhibited by the side surface of the projection, it is preferably included to set the surface of the projection to have a dimension such that the distance from the surface thereof to the shaft center is equal to or slightly larger than the radius of the shaft, as described above. This is because, by setting the dimension of the surface of the projection in this manner, there will be a slight gap or there will be no gap between the surface of the projection and the shaft surface. Therefore, one can restrain the sealing fluid from entering between these surfaces, and it will be easy to return the leaked fluid to the sealing fluid side along the side surface of the projection. Also, as an example of the construction for allowing the above-described function to be exhibited by the side surface of the projection, the side surface of the projection may be provided with a tilted surface that is tilted to the rotation direction side of the shaft as it goes from the anti-sealing fluid side to the sealing fluid side. When such a tilted surface is provided, the fluid that has leaked to the anti-sealing fluid side is returned to the sealing fluid side along the tilted surface by the shaft rotation. Also, since the sliding resistance is not generated at all or, even if it is generated, the sliding resistance is little between the aforesaid projection and the shaft surface, the possibility that the projection is worn by the sliding movement is low. Therefore, the effect of restraining the turn-over of the seal lip and the effect of enhancing the sealing performance by providing the projection can be restrained from decreasing.

Further, more specifically, according to the invention, there is provided a sealing apparatus that seals an annular gap between a shaft and a housing that are relatively rotated, the sealing apparatus being provided with a seal lip that extends toward the sealing fluid side to be in sliding contact with a shaft surface, characterized in that an annular portion is provided that projects out more to the sealing fluid side than the seal lip, and the annular portion is provided with a projection, where the distance between the surface of the projection and the shaft center is set to have a dimension equal to or slightly larger than the radius of the shaft, and at least a part of the side surface of the projection exhibits a suction function of returning the fluid that comes in to the inner circumference side of the annular portion to the sealing fluid side when the shaft and the housing are relatively rotated.

According to the construction of the present invention, by providing an annular portion that projects more to the sealing fluid side than the seal lip, the turn-over of the seal lip by insertion of the shaft is restrained irrespective of the insertion direction. In addition, since the surface of the projection provided in this annular portion is set to have a dimension such that the distance from the surface thereof to the shaft center is equal to or slightly larger than the radius of the shaft, a slight gap intervenes between the surface of the projection and the shaft surface or, even if they abut against each other, little contact force is present. Therefore, the sliding resistance against the shaft surface caused by this projection is not generated at all or, even if it is generated, the sliding resistance is little. Also, at least a part of the side surface of the projection exhibits a suction function of returning the fluid that enters the inner circumference side of the annular portion to the sealing fluid side when the shaft and the housing are relatively rotated, so that the sealing performance can be enhanced. Here, as one of the constructions for allowing this function to be exhibited by the side surface of the projection, it is preferably included to set the surface of the projection to have a dimension such that the distance from the surface thereof to the shaft center is equal to or slightly larger than the radius of the shaft, as described above. This is because, by setting the dimension of the surface of the projection in this manner, there will be a slight gap or there will be no gap between the surface of the projection and the shaft surface. Therefore, one can restrain the sealing fluid from entering between these surfaces, and it will be easy to return the fluid to the sealing fluid side along the side surface of the projection. Also, as an example of the construction for allowing the above-described function to be exhibited by the side surface of the projection, the side surface of the projection may be provided with a tilted surface that is tilted to the rotation direction side of the shaft as it goes from the anti-sealing fluid side to the sealing fluid side. When such a tilted surface is provided, the fluid is returned to the sealing fluid side along the tilted surface by the shaft rotation. Also, since the sliding resistance is not generated at all or, even if it is generated, the sliding resistance is little between the aforesaid projection and the shaft surface, the possibility that the projection is worn by the sliding movement is low. Therefore, the effect of restraining the turn-over of the seal lip and the effect of enhancing the sealing performance by providing the projection can be restrained from decreasing.

It is preferable that one of a pair of the side surfaces of the projection exhibits the suction function when the shaft and the housing are relatively rotated in a first direction, and the other one of the pair of the side surfaces exhibits the suction function when the shaft and the housing are relatively rotated in a second direction opposite to the first direction.

By constructing in this manner, the sealing performance can be enhanced irrespective of the relative rotation direction of the shaft and the housing.

In this manner, according to the construction of the present invention, with the part where the sliding resistance is not generated or with the part where the sliding resistance is generated slightly, the turn-over of the seal lip can be restrained, and also the sealing performance can be enhanced. By this, one can reduce the contact force of the part of the seal lip tip end that is in sliding contact with the shaft surface. Namely, the mechanical loss can be reduced. Eventually, the mechanical loss caused by the contact force of the seal lip to the shaft surface can be reduced while maintaining a stable sealing performance and while restraining the generation of the turn-over of the seal lip. Here, as a construction for reducing the contact force of the part of the seal lip tip end that is in sliding contact with the shaft surface, reduction of a interference relative to the shaft surface can be raised as a preferred example.

Here, the above-described constructions can be adopted by being combined as far as it is possible.

EFFECTS OF THE INVENTION

As described above, according to the present invention, the mechanical loss caused by the seal lip can be reduced while maintaining a stable sealing performance and while restraining the generation of the turn-over of the seal lip.

BEST MODES FOR CARRYING OUT THE INVENTION

Hereafter, best modes for carrying out this invention will be described in detail in an exemplifying manner on the basis of an Examples with reference to the drawings. However, the dimension, the material, and the shape of the constituent elements described in these Examples as well as the relative arrangement thereof are not intended to limit the scope of this invention to these alone, unless specifically described in particular.

EXAMPLE 1

With reference to FIG. 1, a sealing apparatus according to Example 1 of the present invention will be described. FIG. 1 is a partial cross-sectional view of a sealing apparatus according to Example 1 of the present invention.

The sealing apparatus according to the Example of the present invention is used for sealing an annular gap between a shaft and a housing, not illustrated, that are relatively rotated, more specifically an annular gap between the surface of the shaft and the inner circumferential surface of the shaft hole provided in the housing into which this shaft is inserted. For example, in the case of an oil seal, an annular gap between the shaft and the shaft hole is sealed to prevent leakage of the oil.

A sealing apparatus 100 is provided with a reinforcing ring 10 having a generally L-shaped cross section and a rubber-like elastic body 20 that is baked and fixed to this reinforcing ring 10. The reinforcing ring 10 is provided with a cylindrical portion 11 that is disposed concentrically with a shaft hole provided in the housing and the shaft center of the shaft and an inwardly facing flange portion 12 that is inwardly bent from the end of the cylindrical portion 11.

The rubber-like elastic body 20 is provided with an outer circumferential seal 21 that seals an inner circumferential surface of the shaft hole provided in the housing, a seal lip 22 that seals by being in sliding contact with the shaft surface, and a dust lip 23 that seals by being in sliding contact with the shaft surface in the same manner. In the drawings, X indicates a position corresponding to the shaft surface when the sealing apparatus 100 is mounted in an annular gap between the shaft and the housing. Then, the outer circumferential seal 21 is provided at an outside part in the cylindrical portion 11 of the reinforcing ring 10, and seals by being in close contact with the inner circumferential surface of the shaft hole provided in the housing. Here, the outer circumferential surface of the outer circumferential seal 21 is basically in close contact with the inner circumferential surface of the shaft hole provided in the housing, and there is no relative movement between these; however, it may be constructed so that there is a relative movement.

The seal lip 22 extends from a neighborhood of the tip end of the inwardly facing flange portion 12 of the reinforcing ring 10 towards the sealing fluid side O to be in sliding contact with the shaft surface. The tip end part of the seal lip 22 is provided with a first taper surface 22a that reduces its own radius according as it goes from the sealing fluid side O towards the anti-sealing fluid side (usually an open air side) A and a second taper surface 22b that enlarges its own radius according as it goes from the sealing fluid side O towards the anti-sealing fluid side A. An annular edge is formed by these taper surfaces. The radius of this annular edge part is smaller than the radius of the shaft. Therefore, as illustrated in the drawings, the edge part is located more to the inside than the shaft surface X in a state before deformation of the seal lip 22, and this part that extends to the inside will be a interference. Then, in a state in which the shaft is inserted, the seal lip 22 is elastically deformed to the outside for the amount of the provided interference, and the neighborhood of the edge will be in contact with the shaft surface in a state of being capable of being in sliding contact at a predetermined contact force. The seal lip 22 constructed in this manner mainly exhibits a function of preventing the leakage of the sealing fluid from the sealing fluid side O. Also, at the outer circumference of the seal lip 22, a spring 30 is inserted and attached so that the edge part of the seal lip 22 may be in contact with the shaft surface more uniformly and at a suitable contact force.

The dust lip 23 extends from a neighborhood of the tip end of the inwardly facing flange portion 12 of the reinforcing ring 10 towards the anti-sealing fluid side A and comes into sliding contact with the shaft surface in a state in which the shaft is inserted. This dust lip 23 mainly exhibits a function of preventing the penetration of foreign substances (dust and the like) coming from the outside to the sealing fluid side O.

In the present Example, a projection 24 is provided at the root of the seal lip 22. Here, the root of the seal lip 22 is a part located more to the anti-sealing fluid side A than at least the neighborhood of the edge (the part that forms a interference) at the lip tip end. Regarding this projection 24, a plurality of those having the same shape and the same dimension are provided in the circumferential direction in the present Example. Then, the surface 24c of this projection 24 is set to have a dimension such that the distance from the surface 24c thereof to the shaft center is equal to or slightly larger than the radius of the shaft. Therefore, with this surface 24c, little sliding resistance is generated, or the sliding resistance is not generated at all, against the shaft surface. In the example shown in FIG. 1, this distance is set to be a dimension slightly larger than the radius of the shaft, and a slight gap s intervenes between the surface 24c and the shaft surface X. Therefore, the sliding resistance is not generated between these, so that the mechanical loss is not generated.

Also, the projection 24 is provided with a pair of side surfaces (first side surface 24a and second side surface 24b) that are tilted relative to the axial direction from the anti-sealing fluid side A towards the sealing fluid side O. Then, between the first side surface 24a and the second side surface 24b that are adjacent, a recess 25 is formed having a generally triangular shape and being recessed relative to the surface 24c of the projection 24.

As described above, by providing a projection 24 at a position located more to the root than the sliding contact part of the lip tip end in the seal lip 22 so that the sliding resistance may not be generated or so that the sliding resistance may be generated only slightly, the turn-over of the seal lip 22 can be restrained, and the sealing performance can be enhanced without increasing the mechanical loss. A further detailed description will be made on this point.

In a seal lip that extends to the sealing fluid side O, in the case of inserting a shaft from the sealing fluid side O to the anti-sealing fluid side A, the tip end of the seal lip is drawn by the shaft surface, and the seal lip is turned over to the inside, thereby raising a fear of deteriorating the sealing function. In contrast to this, in the present Example, by providing a projection 24, the modulus of section increases against the bend of the seal lip 22 caused by the acting force that is generated in inserting the shaft. Therefore, the seal lip 22 is less likely to be bent, whereby the turn-over of the seal lip 22 can be restrained. Also, since this projection 24 does not give adverse effects on the mechanical loss, the dimension of the projection 24 in the axial direction can be sufficiently ensured, and the turn-over of the seal lip 22 can be sufficiently restrained.

Also, the first side surface 24a or the second side surface 24b in the projection 24 exhibits a suction function of returning the fluid that has leaked from the lip tip end of the seal lip 22 to the sealing fluid side O when the shaft and the seal lip 22 are relatively rotated.

Namely, when the shaft is being rotated in the A direction shown by the model of (a) in FIG. 1 relative to the seal lip 22, the fluid that leaks from the lip tip end flows into the recess 25 and thereafter flows in the A direction along the first side surface 24a to be returned to the sealing fluid side O. Here, the first side surface 24a is tilted towards the rotation direction on the A direction side as it goes from the anti-sealing fluid side A towards the sealing fluid side O, as illustrated in the drawings. Also, when the shaft is being rotated in the B direction shown by the model of (a) in FIG. 1 relative to the seal lip 22, the fluid that leaks from the lip tip end flows into the recess 25 and thereafter flows in the B direction along the second side surface 24b to be returned to the sealing fluid side O. Here, the second side surface 24b is tilted towards the rotation direction on the B direction side as it goes from the anti-sealing fluid side A towards the sealing fluid side O, as illustrated in the drawings.

In this manner, irrespective of the rotation direction, the fluid that has leaked from the lip tip end is returned to the sealing fluid side O, so that the sealing performance can be enhanced. Here, since the projection 24 does not give adverse effects on the mechanical loss, the dimension of the projection 24 in the axial direction can be sufficiently ensured, and the suction function can be sufficiently exhibited.

In this manner, according to the construction of the present Example, with the part where the sliding resistance is not generated or with the part where the sliding resistance is generated only slightly in the root part of the seal lip 22, the turn-over of the seal lip 22 can be restrained, and also the sealing performance can be enhanced. By this, one can reduce the contact force of the part of the seal lip tip end that is in sliding contact with the shaft surface. Namely, the mechanical loss can be reduced. Eventually, the mechanical loss caused by the contact force of the seal lip 22 to the shaft surface can be reduced while maintaining a stable sealing performance and while restraining the generation of the turn-over of the seal lip 22. Here, as a construction for reducing the contact force of the part of the seal lip tip end that is in sliding contact with the shaft surface, reduction of a interference relative to the shaft surface can be raised as a preferred example.

Here, by providing a known thread (thread projections, thread grooves, or thread-like cut-outs) on the second taper surface 22b in the tip end part of the seal lip 22 in the present Example, a thread pump function can be exhibited, so as to enhance the effect of returning the fluid to the sealing fluid side O.

EXAMPLE 2

With reference to FIGS. 2 to 4, a sealing apparatus according to Example 2 of the present invention will be described. FIG. 2 is a partial cross-sectional view of the sealing apparatus according to Example 2 of the present invention. FIG. 3 is a perspective view showing an appearance of the sliding part of the seal lip and the shaft of the sealing apparatus according to Example 2 of the present invention. FIG. 4 is a front view (figure where FIG. 3 is viewed from the top) showing an appearance of the sliding part of the seal lip and the shaft of the sealing apparatus according to Example 2 of the present invention.

The sealing apparatus according to the Example of the present invention also is used for sealing an annular gap between a shaft and a housing, not illustrated, that are relatively rotated, more specifically an annular gap between the surface of the shaft and the inner circumferential surface of the shaft hole provided in the housing into which this shaft is inserted, in the same manner as in the above-described Example 1. For example, in the case of an oil seal, an annular gap between the shaft and the shaft hole is sealed to prevent leakage of the oil.

A sealing apparatus 150 is provided with a reinforcing ring 60 having a generally L-shaped cross section and a rubber-like elastic body 70 that is baked and fixed to this reinforcing ring 60. The reinforcing ring 60 is provided with a cylindrical portion 61 that is disposed concentrically with a shaft hole provided in the housing and the shaft center of the shaft and an inwardly facing flange portion 62 that is inwardly bent from the end of the cylindrical portion 61.

The rubber-like elastic body 70 is provided with an outer circumferential seal 71 that seals an inner circumferential surface of the shaft hole provided in the housing, a seal lip 72 that seals by being in sliding contact with the shaft surface, and a dust lip 73 that seals by being in sliding contact with the shaft surface in the same manner. In the drawings, X indicates a position corresponding to the shaft surface when the sealing apparatus 150 is mounted in an annular gap between the shaft and the housing. Then, the outer circumferential seal 71 is provided at an outside part in the cylindrical portion 61 of the reinforcing ring 60, and seals by being in close contact with the inner circumferential surface of the shaft hole provided in the housing. Here, the outer circumferential surface of the outer circumferential seal 71 is basically in close contact with the inner circumferential surface of the shaft hole provided in the housing, and there is no relative movement between these; however, it may be constructed so that there is a relative movement.

The seal lip 72 extends from a neighborhood of the tip end of the inwardly facing flange portion 62 of the reinforcing ring 60 towards the sealing fluid side O to be in sliding contact with the shaft surface. The tip end part of the seal lip 72 on the inner circumference side is provided with a first taper surface 72a that reduces its own radius according as it goes from the sealing fluid side O towards the anti-sealing fluid side (usually an open air side) A and a second taper surface 72b that enlarges its own radius according as it goes from the sealing fluid side O towards the anti-sealing fluid side A. An annular edge is formed by these taper surfaces. The radius of this annular edge part is smaller than the radius of the shaft. Therefore, as illustrated in the drawings, the edge part is located more to the inside than the shaft surface X in a state before deformation of the seal lip 72, and this part that extends to the inside will be a interference. Then, in a state in which the shaft is inserted, the seal lip 72 is elastically deformed to the outside for the amount of the provided interference, and the neighborhood of the edge will be in contact with the shaft surface, in a state of being capable of being in sliding contact at a predetermined contact force. The seal lip 72 constructed in this manner mainly exhibits a function of preventing the leakage of the sealing fluid from the sealing fluid side O. Also, at the outer circumference of the seal lip 72, a spring 80 is inserted and attached so that the edge part of the seal lip 72 may be in contact with the shaft surface more uniformly and at a suitable contact force.

The dust lip 73 extends from a neighborhood of the tip end of the inwardly facing flange portion 62 of the reinforcing ring 60 towards the anti-sealing fluid side A and comes into sliding contact with the shaft surface in a state in which the shaft is inserted. This dust lip 73 mainly exhibits a function of preventing the penetration of foreign substances (dust and the like) coming from the outside to the sealing fluid side O.

Here, the sealing apparatus 150 according to the present Example is provided with an annular portion K that protrudes more to the sealing fluid side O than the seal lip 72. In addition, this annular portion K is provided with a plurality of projections 74. A plurality of these projections 74 having the same shape and the same dimension are provided in the circumferential direction in the present Example. Then, the surface 74c of this projection 74 is set to have a dimension such that the distance from the surface 74c thereof to the shaft center is equal to or slightly larger than the radius of the shaft. Therefore, with this surface 74c, little sliding resistance is generated, or the sliding resistance is not generated at all, against the shaft surface. In the example shown in FIG. 2, this distance is set to be a dimension slightly larger than the radius of the shaft, and a slight gap s intervenes between the surface 74c and the shaft surface X. Therefore, the sliding resistance is not generated between these, so that the mechanical loss is not generated.

Also, the projection 74 is provided with a pair of side surfaces (first side surface 74a and second side surface 74b) that are tilted relative to the axial direction from the anti-sealing fluid side A towards the sealing fluid side O. Then, between the first side surface 74a and the second side surface 74b that are adjacent, a recess 75 is formed having a generally triangular shape and being recessed relative to the surface 74a of the projection 74.

As described above, by providing a projection 74 in the annular portion K provided at a position located more to the sealing fluid side O than the seal lip 72 so that the sliding resistance may not be generated or so that the sliding resistance may be generated only slightly, the turn-over of the seal lip 72 can be restrained, and the sealing performance can be enhanced without increasing the mechanical loss. A further detailed description will be made on this point.

In a seal lip that extends to the sealing fluid side O, in the case of inserting a shaft from the sealing fluid side O to the anti-sealing fluid side A, the tip end of the seal lip is drawn by the shaft surface, and the seal lip is turned over to the inside, thereby raising a fear of deteriorating the sealing function. In contrast to this, in the present Example, even if the tip end of the seal lip 72 is drawn by the shaft surface, the annular portion K provided at a position located more to the sealing fluid side O than the seal lip 72 regulates the bending of the seal lip 72 towards the inside within a constant range. Therefore, in the present Example, the turn-over of the seal lip 72 can be prevented. Also, since this annular portion K does not give adverse effects on the mechanical loss, the dimension of the annular portion K in the axial direction can be sufficiently ensured, and the turn-over of the seal lip 72 can be sufficiently restrained.

Also, the first side surface 74a or the second side surface 74b in the projection 74 exhibits a suction function of returning the fluid that enters the inner circumference side of the annular portion K to the sealing fluid side O when the shaft and the seal lip 72 are relatively rotated. Namely, when the shaft is being rotated in the A direction shown by the model of (a) in FIG. 2 relative to the seal lip 72, the fluid that enters the inner circumference side of the annular portion K flows into the recess 75 and thereafter flows in the A direction along the first side surface, 74a to be returned to the sealing fluid side O. Here, the first side surface 74a is tilted towards the rotation direction on the A direction side as it goes from the anti-sealing fluid side A towards the sealing fluid side O, as illustrated in the drawings. Also, when the shaft is being rotated in the B direction shown by the model of (a) in FIG. 2 relative to the seal lip 72, the fluid that enters the inner circumference side of the annular portion K flows into the recess 75 and thereafter flows in the B direction along the second side surface 74b to be returned to the sealing fluid side O. Here, the second side surface 74b is tilted towards the rotation direction on the B direction side as it goes from the anti-sealing fluid side A towards the sealing fluid side O, as illustrated in the drawings.

In this manner, irrespective of the rotation direction, the fluid that enters the inner circumference side of the annular portion K is returned to the sealing fluid side O, so that the sealing performance can be enhanced. Here, since the projection 74 does not give adverse effects on the mechanical loss, the dimension of the projection 74 in the axial direction can be sufficiently ensured, and the suction function can be sufficiently exhibited.

In this manner, according to the construction of the present Example, with the part where the sliding resistance is not generated or with the part where the sliding resistance is generated only slightly at a position located more to the sealing fluid side O than the seal lip 72, namely, with the annular portion K, the turn-over of the seal lip 72 can be restrained, and also the sealing performance can be enhanced. By this, one can reduce the contact force of the part of the seal lip tip end that is in sliding contact with the shaft surface. Namely, the mechanical loss can be reduced. Eventually, the mechanical loss caused by the contact force of the seal lip 72 to the shaft surface can be reduced while maintaining a stable sealing performance and while restraining the generation of the turn-over of the seal lip 72. Here, as a construction for reducing the contact force of the part of the seal lip tip end that is in sliding contact with the shaft surface, reduction of a interference relative to the shaft surface can be raised as a preferred example.

Also, the present Example produces an effect of enlarging the seal lip 72 toward the outside as compared with the above-described Example 1, so that the contact force of the part of the seal lip tip end that is in sliding contact with the shaft surface can be further reduced. Hereafter, a further detailed description will be given on this point with reference to FIGS. 3 and 4 in particular.

As illustrated in FIG. 3, when the sealing apparatus 150 and the shaft 300 are relatively rotated in the direction of the arrow X, the sealing fluid flows in the direction of the arrow Y along the second side surface 74b to be returned to the sealing fluid side O. In this case, the sealing fluid flows into a gap between the inner circumference side of the projection 74 and the surface of the shaft 300 (arrow V), as illustrated in FIG. 4. This enlarges the projection 74 in the outer diameter direction (arrow W) by receiving a force acting from the inner circumference side towards the outer circumference side. Therefore, when the sealing apparatus 150 and the shaft 300 are relatively rotated, the seal lip 72 is enlarged in the outer diameter direction together with the annular portion K, so that the contact force of the part of the seal lip tip end that is in sliding contact with the shaft surface is reduced. Therefore, in the case of the present Example, the mechanical loss can be further reduced as compared with the above-described Example 1. Also, when the seal lip 72 is enlarged in the outer diameter direction, the thickness of the fluid film (oil film or the like) formed on the lip tip end and on the shaft surface also increases, thereby also producing an effect of restraining the wear of the lip tip end.

Here, by providing a known thread (thread projections, thread grooves, or thread-like cut-outs) on the second taper surface 72b in the tip end part of the seal lip 72 in the present Example, a thread pump function can be exhibited, so as to enhance the effect of returning the fluid to the sealing fluid side O.

Figure 1:
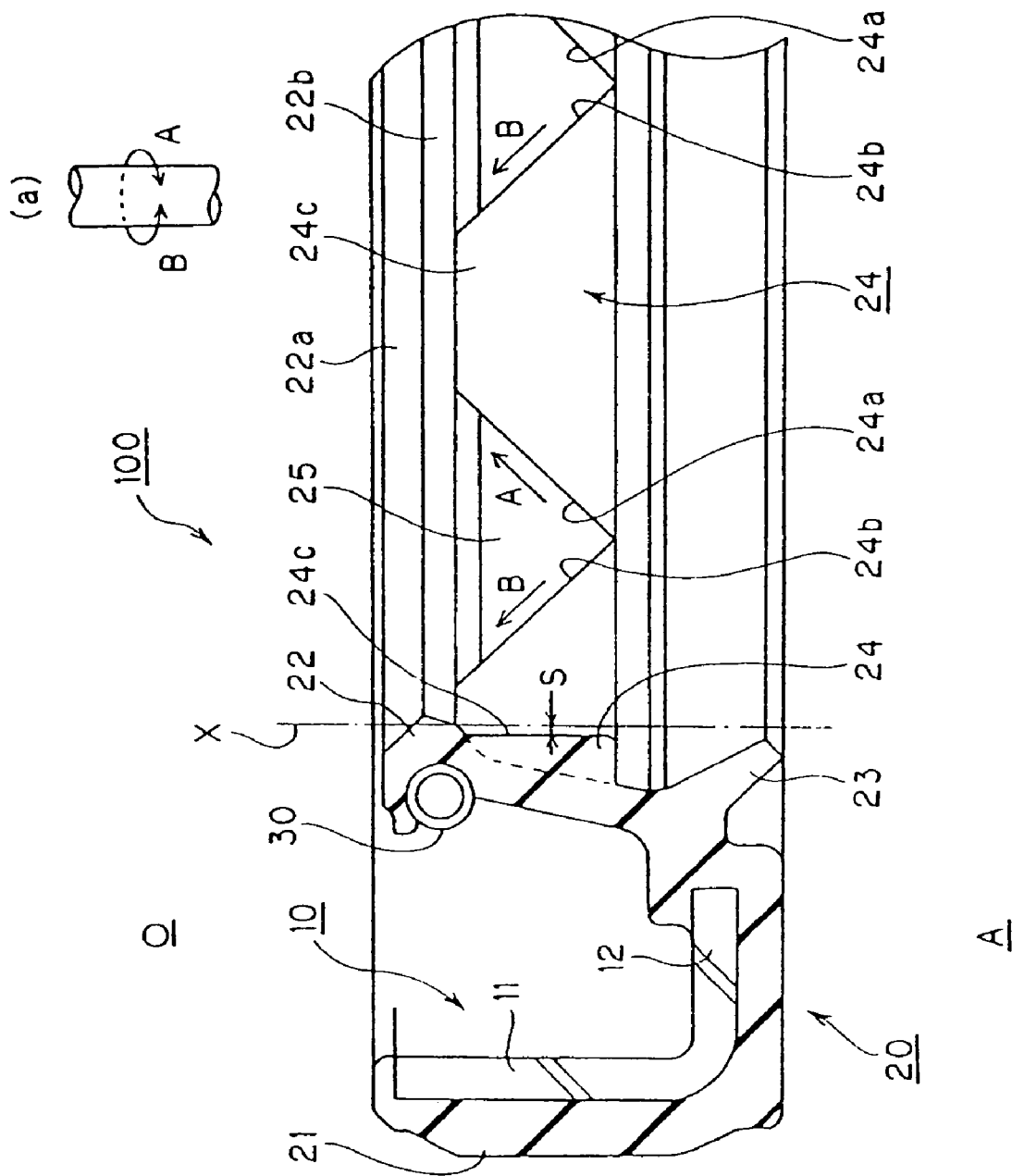
FIG. 1 is a partial cross-sectional view of a sealing apparatus according to Example 1 of the present invention.
Figure 2:
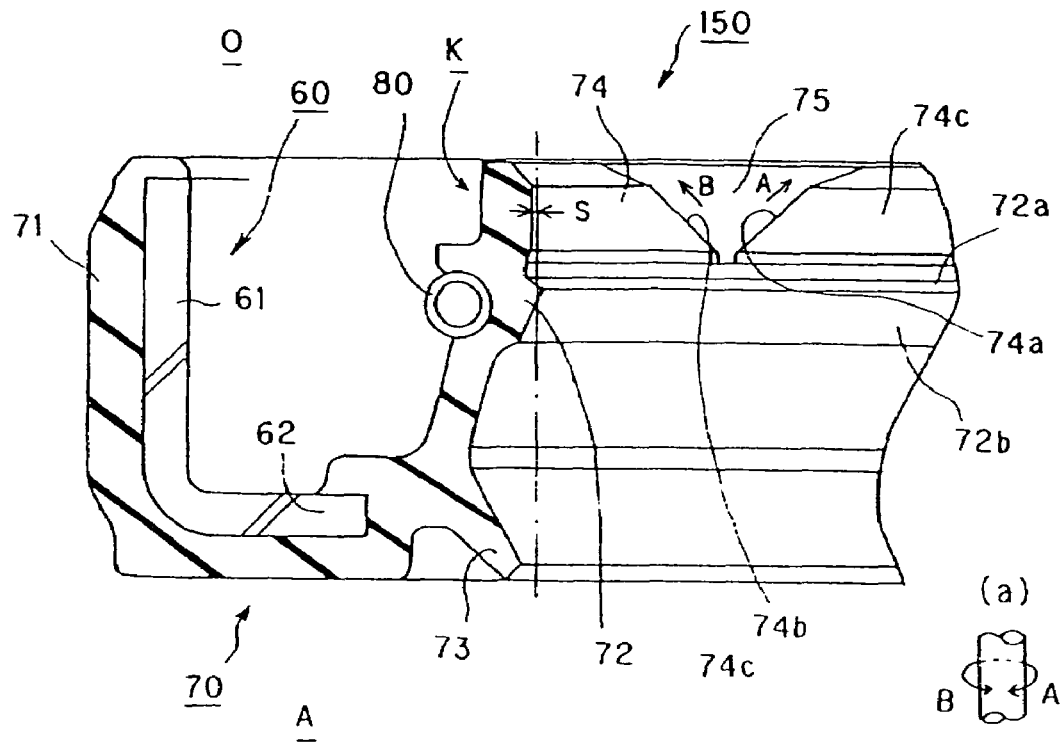
FIG. 2 is a partial cross-sectional view of a sealing apparatus according to Example 2 of the present invention.
Figure 3:
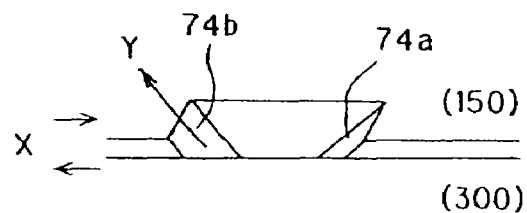
FIG. 3 is a perspective view showing an appearance of the sliding part of the seal lip and the shaft of the sealing apparatus according to Example 2 of the present invention.
Figure 4:
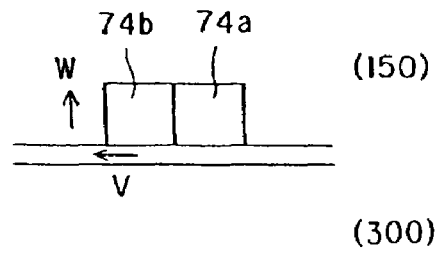
FIG. 4 is a front view showing an appearance of the sliding part of the seal lip and the shaft of the sealing apparatus according to Example 2 of the present invention.
Figure 5:
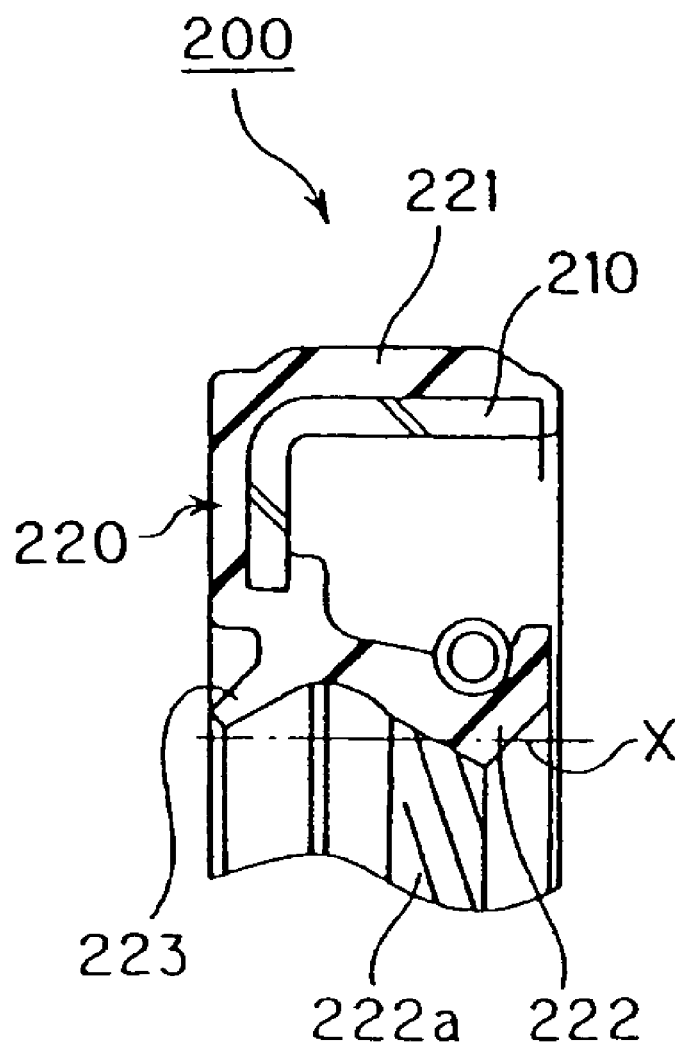
FIG. 5 is a partial cross-sectional view of a sealing apparatus according to a related art.

DESCRIPTION OF REFERENCE NUMERALS 10, 60 REINFORCING RING
11, 61 CYLINDRICAL PORTION
12, 62 FLANGE PORTION
20, 70 RUBBER-LIKE ELASTIC BODY
21, 71 OUTER CIRCUMFERENCE SEAL
22, 72 SEAL LIP
22A, 72A FIRST TAPER SURFACE
22B, 72B SECOND TAPER SURFACE
23, 73 DUST LIP
24, 74 PROJECTION
24A, 74A FIRST SIDE SURFACE
24B, 74B SECOND SIDE SURFACE
24C, 74C SURFACE
25, 75 RECESS
30, 80 SPRING
100, 150 SEALING APPARATUS
300 SHAFT
A ANTI-SEALING FLUID SIDE
K ANNULAR PORTION
O SEALING FLUID SIDE
S SLIGHT GAP
X SHAFT SURFACE

What is claimed is:

1. A sealing apparatus sealing an annular gap between a shaft and a housing, the shaft and the housing being relatively rotated, the combination of the sealing apparatus, the shaft and the housing comprising
    a seal lip extending toward a sealing fluid side in sliding contact with a surface of the shaft,
    a plurality of truncated triangular shaped projections spaced apart at a root of the seal lip and extending towards said sealing fluid side,
    a distance between a surface of the plurality of projections and a center of the shaft being slightly larger than a radius of the shaft, and
    at least a part of a side surface of each of the plurality of projections exhibiting a suction function of returning fluid that has leaked from a seal lip tip end to the sealing fluid side when the shaft and the housing are relatively rotated,
    each of the plurality of projections including and extending at a same level as and between a set of side surfaces of each of the plurality of projections,
    the side surfaces of one projection of the plurality of projections and an adjacent projection of the plurality of projections define a triangular shaped recess located between the one projection and the adjacent projection with the recess opening and pointing down towards the seal tip end and towards said sealing fluid side and having an apex pointing toward an anti-sealing fluid side.

2. The sealing apparatus according to claim 1, wherein one of the side surfaces of the projection exhibits the suction function when the shaft and the housing are relatively rotated in a first direction, and the other one of the side surfaces exhibits the suction function when the shaft and the housing are relatively rotated in a second direction opposite to the first direction.

3. A sealing apparatus sealing an annular gap between a shaft and a housing, the shaft and the housing being relatively rotated, the combination of the sealing apparatus, the shaft and the housing comprising
    a seal lip extending toward a sealing fluid side in sliding contact with a surface of the shaft,
    an annular portion projecting out more to the sealing fluid side than the seal lip, and
    the annular portion including a plurality of projections, a distance between a surface of the projection and a center of the shaft being slightly larger than a radius of the shaft, and
    at least a part of a side surface of each of the plurality of projections exhibiting a suction function of returning fluid that comes in from an inner circumference side of the annular portion to the sealing fluid side when the shaft and the housing are relatively rotated,
    each of the plurality of projections including and extending at a same level as and between a set of side surfaces of each of the plurality of projections,
    the side surfaces of one projection of the plurality of projections and an adjacent projection of the plurality of projections define a triangular shaped recess located between the one projection and the adjacent projection with the recess having an apex pointing down towards the seal tip end and towards an anti-sealing fluid side and extending in a direction opposite to said sealing fluid side.

4. The sealing apparatus according to claim 3, wherein one of the side surfaces of the projection exhibits the suction function when the shaft and the housing are relatively rotated in a first direction, and the other one of the side surfaces exhibits the suction function when the shaft and the housing are relatively rotated in a second direction opposite to the first direction.

* * * * *